UNITED STATES PATENT OFFICE.

ALEXANDER H. EVERETT, OF NEW YORK, N. Y.

IMPROVEMENT IN THE COMPOSITION AND MANUFACTURE OF IRON.

Specification forming part of Letters Patent No. 47,198, dated April 11, 1865.

*To all whom it may concern:*

Be it known that I, ALEXANDER H. EVERETT, of New York city, New York, have invented certain new and useful Improvements in the Composition and Manufacture of Iron; and I do hereby declare that the following is a full, clear, and exact description of the same.

To carry out the process as above referred to, I take eighty parts of common anthracite pig-iron, twenty parts wrought-iron, three parts of oxide of manganese, and three to five parts of oxide of iron, to which I add as a flux (for the purpose of removing impurities) two or three parts of fluor-spar or some other fluoride. This mixture—viz., eighty parts cast-iron, twenty parts wrought-iron, three parts oxide iron, three parts oxide manganese, two parts fluor-spar—should be as intimately mixed as convenient in a crucible and placed in an ordinary pot-furnace and melted, care being taken to have the contents of the crucible well stirred from time to time.

When large quantities of metal are required, I prefer to operate with either the reverberatory furnace or with the McKenzie or other cupola-furnace, in which case the manipulation differs essentially from that above described. To perform this operation the cast-iron is first melted and the foregoing-named ingredients are added in the proportions as before described. When the heat of the compound is raised sufficiently to melt the wrought-iron, it is introduced, having been previously brought up to a heat a little short of fusion. This may be performed by the waste heat of the furnace.

The addition of the above-described compound to cast-iron results in a very much improved metal greatly increased in strength, capable of being cast in sand, and susceptible of receiving the "chill" to a remarkable degree. The explanation of this improvement is found in the combination of materials introduced, for when the materials are brought to the melting-point the oxide of iron and the oxide of manganese are reduced to the metallic state, thus abstracting so much carbon from the cast-iron, while the wrought-iron combines with a further portion of the carbon. In a reverberatory furnace the flux employed protects the action of the iron from the direct action of the flame, and also combines with the silica and other impurities that may be in the cast-iron.

The use of wrought-iron and oxide of iron may be dispensed with and magnetic iron-ore in equivalent quantities used in their stead, producing substantially the same result.

Having thus fully described my improvement, what I claim as my invention, and desire to secure by Letters Patent, is—

1. The combination of cast-iron, wrought-iron, oxide of manganese, oxide of iron, and fluor-spar or other fluoride, as and for the purposes set forth.

2. The combination of cast-iron, magnetic iron ore, oxide of manganese, and fluor-spar or other fluoride, substantially as set forth and described.

3. The process herein described for improving the qualities of cast-iron.

ALEXANDER H. EVERETT.

Witnesses:
WM. T. DENNIS,
C. W. STAFFORD.